US008478584B1

(12) United States Patent
Grove

(10) Patent No.: US 8,478,584 B1
(45) Date of Patent: Jul. 2, 2013

(54) METHOD AND SYSTEM FOR DOMAIN-OPTIMIZED SEMANTIC TAGGING AND TASK EXECUTION USING TASK CLASSIFICATION ENCODING

(71) Applicant: Kyle Wade Grove, Roseville, CA (US)

(72) Inventor: Kyle Wade Grove, Roseville, CA (US)

(73) Assignee: AskZiggy, Inc., Rocklin, CA (US)

( * ) Notice: Subject to any disclaimer, the term of this patent is extended or adjusted under 35 U.S.C. 154(b) by 0 days.

(21) Appl. No.: 13/669,796

(22) Filed: Nov. 6, 2012

(51) Int. Cl.
*G06F 17/27* (2006.01)

(52) U.S. Cl.
USPC ........................ 704/9; 704/3; 704/4; 704/275

(58) Field of Classification Search
USPC ............................................. 704/9, 3, 4, 275
See application file for complete search history.

(56) References Cited

U.S. PATENT DOCUMENTS

| | | | | |
|---|---|---|---|---|
| 6,182,029 | B1 * | 1/2001 | Friedman | 704/9 |
| 6,466,654 | B1 | 10/2002 | Cooper et al. | |
| 6,539,359 | B1 * | 3/2003 | Ladd et al. | 704/275 |
| 7,266,496 | B2 | 9/2007 | Wang et al. | |
| 7,502,765 | B2 * | 3/2009 | Kummamuru et al. | 706/15 |
| 7,707,032 | B2 | 4/2010 | Wang et al. | |
| 2008/0221903 | A1 * | 9/2008 | Kanevsky et al. | 704/275 |
| 2011/0153322 | A1 * | 6/2011 | Kwak et al. | 704/235 |

OTHER PUBLICATIONS

Meurer, INESS-Search: A Search System for LFG (and other ) Treebanks, Proceeding of the LFG12 Conference, Jun. 28, 2012.*

Harbusch, K., Woch, J., "Integrated Natural Language Generation with Schema-Tree Adjoining Grammars" University of Koblenz-Landau, Computer Science Department. 2002 (31 pages).

Turian, J. et al., "Word Representations: A Simple and General Method for Semi-Supervised Learning", In Proceedings of the 48th Annual Meeting of the Association for Computational Linguistics (Jul. 2010), pp. 384-394.

Cutting, D., et al., "A Practical Part-of-Speech Tagger. Proceedings of the Third Conference on Applied Natural Language Processing" 1992 pp. 133-140.

Rabiner, L., "A Tutorial on Hidden Markov Models and Selected Applications in Speech Recognition" Proceedings of the IEEE, vol. 77, No. 2 Feb. 1989 pp. 257-286.

Merialdo, B., "Tagging English Text with a Probabilistic Model" Association for Computational Linguistics 20(2). 1994 pp. 155-171.

Uschold, M. et al., "Ontologies: Principles, Methods and Applications" to appear in Knowledge Engineering Review vol. 11 No. 2, Jun. 1996, (69 pages).

(Continued)

*Primary Examiner* — Vincent P Harper
(74) *Attorney, Agent, or Firm* — Osha•Liang LLP

(57) ABSTRACT

A method and system for performing a task in a natural language processing system. The method includes processing text to obtain a numerical encoding, where the text includes a number of entities, where at least one of the entities is tagged with the numerical encoding, and where the text is derived from an utterance. The method further includes determining that the numerical encoding identifies a task, determining a variable required to complete the task using the numerical encoding, and generating a first dialogue sentence to obtain a variable value for the variable, where the variable is associated with a second numerical encoding, where the second numerical encoding includes the numerical encoding. The method further includes transmitting the first dialogue sentence to a user device, receiving the variable value for the variable in response to the first dialogue sentence, and performing the task using the variable value.

9 Claims, 15 Drawing Sheets

OTHER PUBLICATIONS

Berger, A. et al., "A Maximum Entropy Approach to Natural Language Processing", Computational Linguistics 22(1). 1996 pp. 39-71.

Marques, L., "Semantic Role Labeling as Sequential Tagging", CONLL '05 Proceeding of the Ninth Conference on Computational Natural Language Learning. 2005 pp. 193-196.

* cited by examiner

| | | | | | | | | | | | | | | |
|---|---|---|---|---|---|---|---|---|---|---|---|---|---|---|
| Utterance | I | need | a | hotel | room | with | a | queen | bed | within | 15 | miles | of | Rocklin |
| Numerical Encodings | 0 | 0 | 0 | 1 | 12 | 0 | 1222 | 12214 | 0 | 0 | 11122 | 11121 | 0 | 1111 |

| Task List |
|---|
| 1 |
| 12 |

| Variable List |
|---|
| 1222 |
| 12214 |
| 11122 |
| 11121 |
| 1111 |

Do you want a [121] room?

What type of [123] do you want in your [121] room with the [1221] bed?

What type of [113] do you want in your hotel?

Do you want a [121] room? → Do you want a smoking room?

Task List
1
12
11

Variable List
1222
12214
11122
11121
1111
1212

What type of [123] do you want in your [121] room with the [1221] bed?

↓

What type of extras do you want in your non-smoking room with the queen bed?

FIG. 9H

| Task List |
|---|
| 1 |
| 12 (completed) |
| 11 |

| Variable List |
|---|
| 1222 |
| 12214 |
| 11122 |
| 11121 |
| 1111 |
| 1212 |
| 1232 |

FIG. 9I

What type of [113] do you want in your hotel?

↓

What type of <u>extras</u> do you want in your hotel?

FIG. 9J

Task List
1
12 (completed)
11 (completed)

Variable List
1222
12214
11122
11121
1111
1212
1232

FIG. 9K

METHOD AND SYSTEM FOR DOMAIN-OPTIMIZED SEMANTIC TAGGING AND TASK EXECUTION USING TASK CLASSIFICATION ENCODING

BACKGROUND

Traditional natural language processing systems include tagging systems and dialogue managers. The tagging systems typically classify each word in a sentence using hard syntactic part of speech classification. This results in the classification of each word, for example, as a noun, verb, adverb, adjective, article, preposition or conjunction. However, the tagging systems do not provide any information about the relatedness between the words, where such information may provide context about the meaning of the word within the sentence or how the word may be used to complete a task.

The dialogue manager typically includes functionality to guide the user to provide appropriate inputs in order to complete a task. Because the traditional tagging systems do not provide any context about what a word means within a sentence and, instead, only provide to which part of speech each word in the sentence corresponds, the dialogue manager (or another component in the natural language processing system) must include additional functionality to determine what each of the words in the sentences means in order to present the appropriate dialogue to the user. The disconnect between the tagging system and the dialogue manager may result in inefficient generation of dialogue and ultimately inefficient task completion.

SUMMARY

In general, in one aspect, the invention relates to a method for performing a task in a natural language processing (NLP) system. The method includes processing text to obtain a numerical encoding, wherein the text comprises a plurality of entities, wherein at least one of the entities is tagged with the numerical encoding, and wherein the text is derived from an utterance, determining that the numerical encoding identifies a task, determining a variable required to complete the task using the numerical encoding, generating a first dialogue sentence to obtain a variable value for the variable, wherein the variable is associated with a second numerical encoding, wherein the second numerical encoding includes the numerical encoding, transmitting the first dialogue sentence to a user device, in response to the transmitting, receiving the variable value for the variable in response to the first dialogue sentence, and performing the task using the variable value.

In general, one aspect, the invention relates to a method for performing a task in a natural language processing (NLP) system. The method includes processing text to obtain a plurality of numerical encodings, wherein the text comprises a plurality of entities, wherein each of the plurality of numerical encodings is associated with one of the plurality of entities, and wherein the text is derived from an utterance, populating a task list with each of the plurality of numerical encodings that have a length less than a pre-determined length, populating a variable list with each of the plurality of numerical encodings that have a length greater than a pre-determined length, selecting a numerical encoding from the task list, wherein the numerical encoding identifies a task in a domain-specific schema, determining that the variable list does not include a variable value required to perform the task, generating a sentence to obtain the variable value associated with a variable, wherein the variable is associated with a second numerical encoding, and wherein the second numerical encoding includes the numerical encoding, transmitting the sentence to a user device, in response to the transmitting, receiving the variable value for the variable in response to the dialogue sentence, and performing the task using the variable value.

In general, in one aspect, the invention relates to a method for performing tasks in a natural language processing (NLP) system. The method includes processing text to obtain a plurality of numerical encodings, wherein the text comprises a plurality of entities, wherein each of the plurality of numerical encodings is associated with one of the plurality of entities, and wherein the text is derived from an utterance, populating a task list with each of the plurality of numerical encodings that have a length less than a pre-determined length, populating a variable list with each of the plurality of numerical encodings that have a length greater than a pre-determined length, selecting a numerical encoding from the task list, wherein the numerical encoding identifies a sub-task in a domain-specific schema, determining a task associated with the sub-task using the numerical encoding, wherein the task is associated with a second numerical encoding and wherein the numerical encoding includes the second numerical encoding, determining a second sub-task associated with the task, wherein the second sub-task is associated with a third numerical encoding and wherein the third numerical encoding includes the second numerical encoding, and performing the sub-task and the second sub-task.

Other aspects of the invention will be apparent from the following description and the appended claims.

BRIEF DESCRIPTION OF DRAWINGS

FIGS. 9A-9K show examples in accordance with one or more embodiments of the invention.

DETAILED DESCRIPTION

Figure 1:
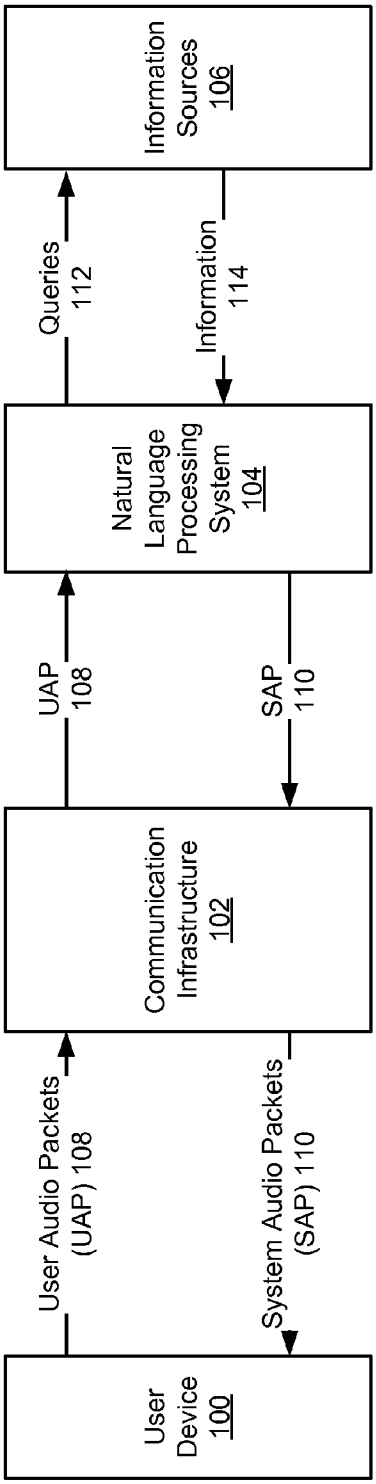
FIG. 1 shows a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-9K, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a natural language processing (NLP) system that includes functionality to use numerical encodings to classify words and phrases obtained from user audio packets and then use the numerical encodings to generate dialogues and/or perform tasks.

In one embodiment of the invention, by tagging the words and/or phrases using numerical encodings, the NLP implicitly associates meaning with each of the words or phrases. This, in turn, enables the NLP system to efficiently perform tasks and/or generate dialogue to obtain additional information required to perform the tasks.

In one embodiment of the invention, numerical encoding refers to associating a number with an entity (defined below). The number is encoded with information about (i) the relationship of the entity within the schema, e.g., the entity is related to a task, sub-task, variable group, variable, and (ii) the relationship (explicit or implicit) of the entity with other entities in the utterance (discussed below) and/or schema, e.g., one entity is a variable that is used to perform a task specified by the another entity in the utterance. The numerical encoding may also indicate that two entities in an utterance are similar, e.g., that both entities belong to the same variable group (see e.g., FIG. 9A). Any numerical encoding scheme may be used to encode the above information without departing from the invention.

In one embodiment of the invention, the numerical encoding is implemented using Gorn Addresses. Gorn Addresses are a series of one or more integers used to identify nodes within a tree data structure. The root of the tree data structure has a Gorn Address of 1. The child nodes of the root of the tree data structure have the following Gorn Addresses: 1[integer representing child node]. For example, if there are two child nodes of the root node, the Gorn Addresses of the child nodes are 11 and 12. Accordingly, the Gorn Address of an arbitrary (non-root) node, j, in the tree data structure is ij, where j is an integer representing the j-th child node of the i-th node in the tree data structure and i is the Gorn Address of the i-th node in the tree data structure.

In another embodiment of the invention, numerical encoding may be implemented as follows: (i) each element type in the schema (e.g., task, sub-task, variable group, variable) may be associated with a distinct (non-overlapping) number range; (ii) all entities of a given element type are tagged with numbers within the associated number range, and (iii) the particular number with which an entity is tagged may be used to encode the relationship (explicit or implicit) of the entity with at least one other entity in the utterance.

FIG. 1 shows a system in accordance with one or more embodiments of the invention. The system includes one or more user devices (100) configured to send user audio packets (UAPs) (108) to the natural language processing (NLP) system (104) via a communication infrastructure (102). The NLP system (104) is configured to receive UAPs, process UAPs (108) to generate System Audio Packets (SAPs) (110), and to send the SAPs (110) to the user device (100). The NLP system (104) is further configured to process the UAPs using, in part, one or more information sources (106).

In one embodiment of the invention, the user device (100) corresponds to any physical device that includes functionality to transmit UAPs to the NLP system (104) and receive SAPs (110) from the NLP system. The user device (100) may further include functionality to execute one or more applications (not shown). The applications may be user-level applications and/or kernel-level applications. The applications are configured to generate UAPs, where UAPs issued by the applications are received and processed by the NLP system (104). The applications may be further configured to receive and process the SAPs. In some embodiments of the invention, the UAPs may be generated by dedicated hardware and/or the SAPs may be processed by dedicated hardware (as discussed below).

In one embodiment of the invention, the physical device may be implemented on a general purpose computing device (i.e., a device with a processor(s), memory, and an operating system) such as, but not limited to, a desktop computer, a laptop computer, a gaming console, and a mobile device (e.g., a mobile phone, a smart phone, a personal digital assistant, a gaming device, etc.).

Alternatively, the physical device may be a special purpose computing device that includes an application-specific processor(s)/hardware configured to only execute embodiments of the invention. In such cases, the physical device may implement embodiments of the invention in hardware as a family of circuits and limited functionality to receive input and generate output in accordance with various embodiments of the invention. In addition, such computing devices may use a state-machine to implement various embodiments of the invention.

In another embodiment of the invention, the physical device may correspond to a computing device that includes a general purpose processor(s) and an application-specific processor(s)/hardware. In such cases, one or more portions of the invention may be implemented using the operating system and general purpose processor(s), and one or more portions of the invention may be implemented using the application-specific processor(s)/hardware.

In one embodiment of the invention, the communication infrastructure (102) corresponds to any wired network, wireless network, or combined wired and wireless network over which the user device (100) and the NLP system (104) communicate. In one embodiment of the invention, the user device (100) and NLP system (104) may communicate using any known communication protocols.

In one embodiment of the invention, the NLP system (104) corresponds to any physical device configured to process the UAPs in accordance with the methods shown in FIGS. 4-8. In one embodiment of the invention, the NLP system (104) is configured to, as part of the processing of the UAPs, send queries to information sources (106) and to receive information (114) from the information sources in response to the queries (112). Additional detail about the NLP system (104) is provided in FIG. 2. Though not shown in FIG. 1, the NLP system and the information sources may communicate over any wired network, wireless network, or combined wired and wireless network using any known communication protocols.

In one embodiment of the invention, the information source may be any searchable source of information. For example, the information source may a be web search engine configured to search for information (typically in the form on webpages) on the World Wide Web, a social network search engine configured to search for information in a social network, a local search engine configured to search for files in a local repository or file system. The information returned may include any text, audio content, images, mixed media content, or any combination thereof.

In one embodiment of the invention, the UAPs are generated by encoding an audio signal in a digital form and then converting the resulting digital audio data into one or more UAPs. The conversion of the digital audio data into one or more UAPs may include applying an audio codec to the digital audio data to compress the digital audio data prior to generating the UAPs. The use of the audio codec may enable a smaller number of UAPs to be sent to the NLP system.

In one embodiment of the invention, the audio signal may be obtained from a user speaking into a microphone on the user device. Alternatively, the audio signal may correspond to a pre-recorded audio signal that the user provided to the user device using conventional methods. In other embodiments of the invention, the user device may receive the digital audio data directly instead of receiving an analog audio signal.

In one embodiment of the invention, the audio signal includes one or more audio utterances. An audio utterance corresponds to a unit of speech bounded by silence. The utterance may be a word, a clause, a sentence, or multiple sentences. A text utterance corresponds to a unit of speech (in text form) that is provided by a user or system, where the unit of speech may be a word, a clause, a sentence, or multiple sentences. Embodiments of the invention apply to both types of utterances. Further, unless otherwise specifies, "utterance" means either an audio utterance, a text utterance, or a combination thereof.

In one embodiment of the invention, the SAPs are generated by converting text into digital audio data and then converting the resulting digital audio data into one or more SAPs. The conversion of the digital audio data into one or more SAPs may include applying an audio codec to the digital audio data to compress the digital audio data prior to generating the SAPs. The use of the audio codec may enable a smaller number of SAPs to be sent to the user device.

While FIG. 1 shows a system that includes a single user device, communication infrastructure, and NLP system, embodiments of the invention may include multiple user devices, communication infrastructures, and NLP systems without departing from the invention. Further, the invention is not limited to the system configuration shown in FIG. 1.

Figure 2:
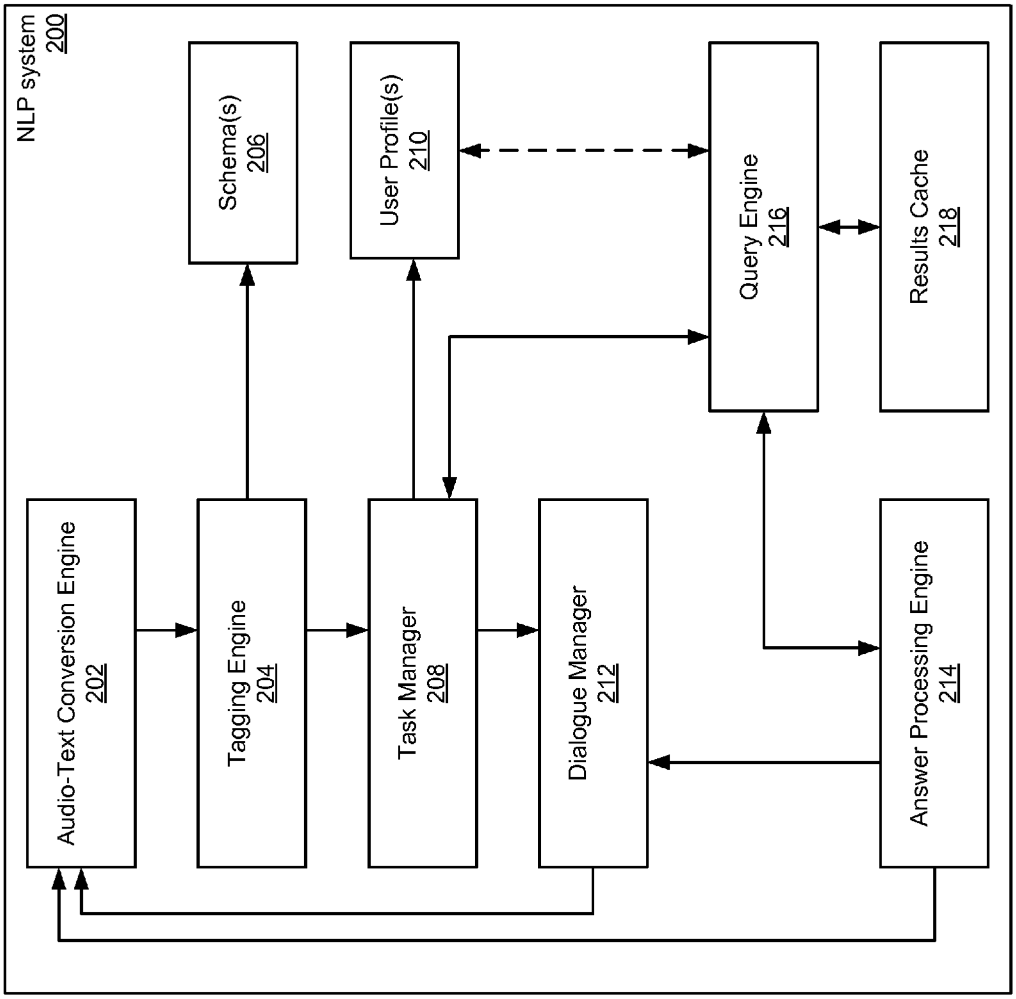
FIG. 2 shows a natural language processing system in accordance with one or more embodiments of the invention.

FIG. 2 shows a natural language processing (NLP) system in accordance with one or more embodiments of the invention. The NLP (200) system includes an audio-text conversion engine (202), a tagging engine (204), a schema (206), a task manager (208), user profile(s) (210), a dialogue manager (212), a query engine (216), an answer processing engine (214), and a results cache (218). Each of these components is described below.

In one embodiment of the invention, the audio-text conversion engine (202) is configured to receive UAPs, extract the digital audio data from the UAPs, and convert the digital audio data into text. Any known methods may be implemented by the audio-text conversion engine (202) to generate text from the digital audio data. The generated text may be viewed as a series of entities where each entity corresponds to a word or character separated by a space. For example, if the text is "Does United offer any one-flights uh, I mean one-way fares to Houston?"—then the entities would be: Does, United, offer, any one-flights, uh, I, mean, one-way, fares, to, Houston.

In one embodiment of the invention, the schema (206) defines the domain over which the tagging engine (204) operates. More specifically, the schema (206) specifies tasks, sub-tasks, variable groups, and variables within the domain. Additional detail about the schema is described in FIGS. 3A and 3B.

In one embodiment of the invention, the tagging engine (204) is a domain-optimized semantic tagger. More specifically, the tagging engine uses the schema to determine how to tag each entity on the text (i.e., the text obtained from the audio-text conversion engine (202)). Specifically, the tagging engine (204) is configured to tag, using the schema, each entity as either noise or with a numerical encoding (discussed below). An entity is tagged as noise if the entity does not correspond to any of a task, a sub-task, a variable group, or a variable. Accordingly, whether a given entity is tagged as noise depends on the particular schema. The tagging engine may use any known method for training the tagging engine to tag the entities as noise or with a numerical encoding. Further, the tagging of entities of the entities may be performed using any known tagging method. For example, the tagging engine may be implemented using any known method of statistical natural language processing.

In one embodiment of the invention, the task manager (208) is configured to manage the processing of all tasks and sub-tasks. The processing of tasks and sub-tasks may include performing one or more steps shown in FIGS. 4-8. The operation of the task manager is described in further detail in FIGS. 4-8 below.

In one embodiment of the invention, each user profile (210) includes information about a user. The information may include, but is not limited to, prior utterances received from the user, tasks performed by the user, various user preferences (which may be obtained directly from the user or indirectly based on prior user activity), or any other information about the user that may be used to process tasks and/or sub-tasks.

In one embodiment of the invention, the dialogue manager (212) is configured to manage dialogue between the user of the user device and the NLP system. In particular, the dialogue manager may include functionality to generate dialogue (typically in the form of questions) to present to the user in order to obtain additional information (typically variable values) in order to process one or more tasks or sub-tasks. (See FIGS. 9A-9K). Said another way, the dialogue manager may be configured to achieve various dialogue goals—where the goals relate to additional information that the dialogue manager attempts to obtain from the user.

In one embodiment of the invention, the query engine (216) is configured to generate queries in order to obtain information from one or more information sources (FIG. 1, 106). The query engine includes functionality to generate different queries (i.e., queries with different formats, etc). for the different types of information sources. The query engine (216) may use user profile(s) in combination with variable values obtained from the user to obtain the necessary information in order to generate a query.

In one embodiment of the invention, the answer processing engine (214) is configured to extract a specific answer from the information (FIG. 1, 114) obtained from the information source and generate the appropriate answer in text format. The answer may be extracted from the information using, for example, answer-type pattern extraction or N-gram tiling. Other methods may be used for extracting the answer from the information without departing from the invention. Alternatively, or additionally, the answer may take the form of single or multiple document summarization. In such cases, the summarization processes may take the general form of (i) content selection, (ii) information ordering, and (iii) sentence realization. Any known method for document summarization may be used without departing from the invention.

In one embodiment of the invention, the results cache (218) includes information obtained from one or more information sources in response to one or more queries. The results cache temporarily stores this information for subsequent use by the task manager or the query engine.

The invention is not limited to the NLP system configuration shown in FIG. 2. In one embodiment of the invention, the NLP system may be implemented on virtually any type of computer system regardless of the platform being used. For example, the NLP system may be implemented on a computer system that includes one or more processor(s), associated memory (e.g., random access memory (RAM), cache memory, flash memory, etc.), a storage device (e.g., a hard disk, an optical drive such as a compact disk drive or digital video disk (DVD) drive, a flash memory stick, etc.), and numerous other elements and functionalities typical of today's computers (not shown). The computer may also include input means, such as a keyboard, a mouse, or a microphone (not shown). Further, the computer may include output means, such as a monitor (e.g., a liquid crystal display (LCD), a plasma display, or cathode ray tube (CRT) monitor). The computer system may be connected to the communication infrastructure (see e.g., FIG. 1, 102) via a network interface connection. Those skilled in the art will appreciate that many different types of computer systems exist, and the aforementioned input and output means may take other forms. Generally speaking, the computer system includes at least the minimal processing, input, and/or output means necessary to practice embodiments of the invention.

Further, those skilled in the art will appreciate that one or more elements of the NLP system may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

While the systems discussed above in FIGS. 1 and 2 relate to obtaining UAPs from user devices and sending SAPs back to the user devices, embodiments of the invention may be implemented on any system that handles dialogue in either text format or audio format (or both). Said another way, the system may receive text corresponding to a written utterance (as opposed to an oral utterance) and process the text accordingly. Thus, embodiments of the invention may be used, for example, with any dialogue system that requires natural language processing regardless of whether such processing is initiated by voice or text. In addition, embodiments of the invention may process utterances that are human generated or computer generated without departing from the invention.

Figure 3A:
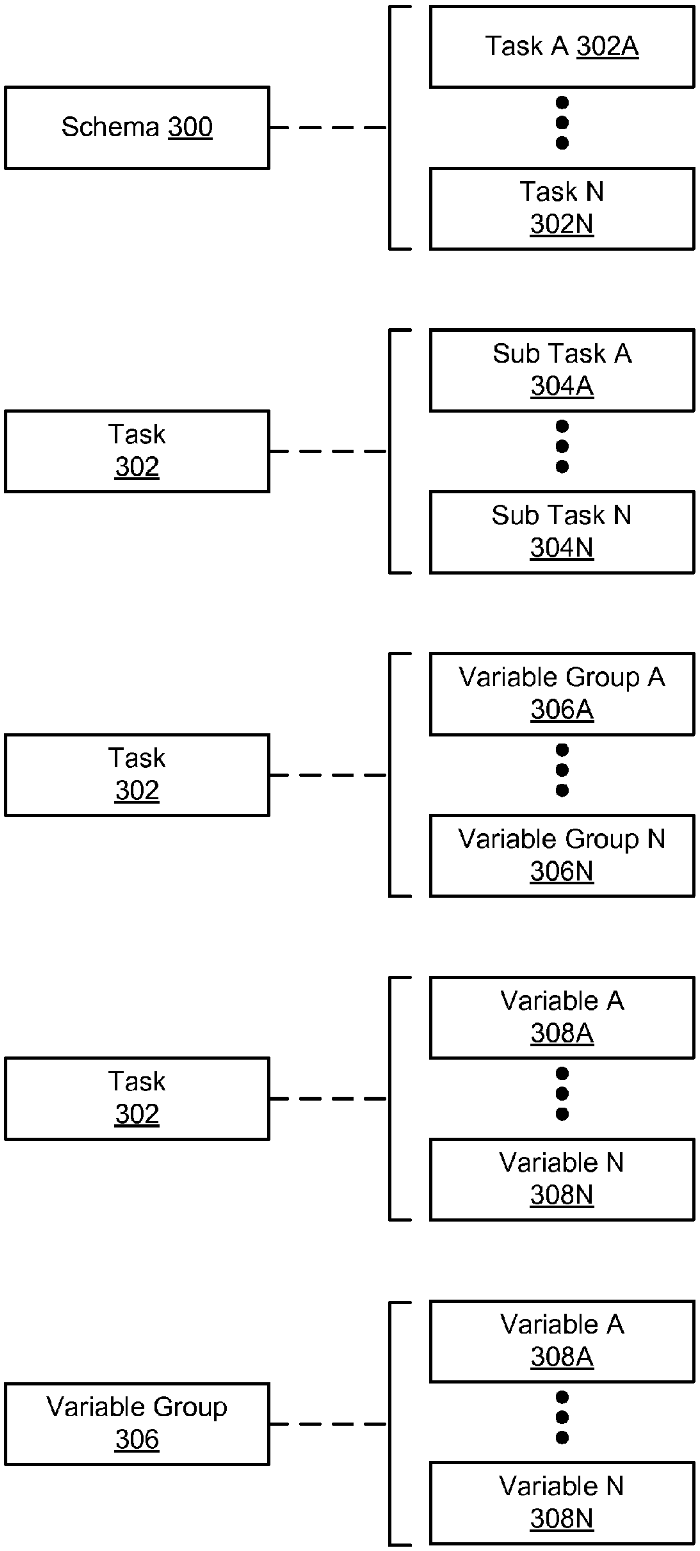
FIGS. 3A and 3B show relationships between various elements in a domain-specific schema in accordance with one or more embodiments of the invention.
Figure 3B:
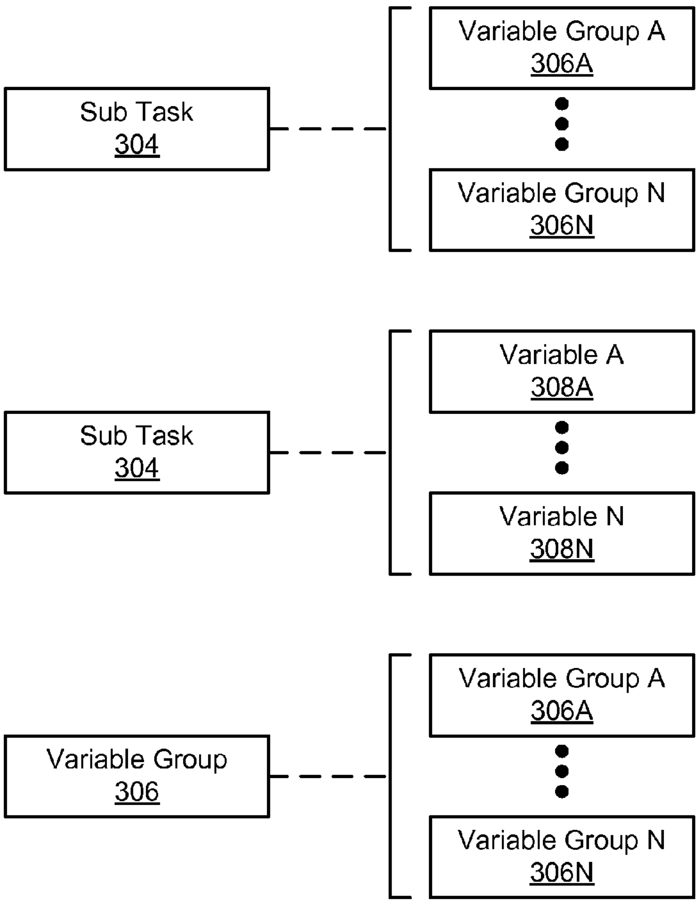

FIGS. 3A and 3B show relationships between various elements in a domain-specific schema (hereafter "schema") in accordance with one or more embodiments of the invention. The schema includes tasks, sub-tasks, variable groups and/or variables. Each of the aforementioned elements is associated with a name (or label) in the schema and a numerical encoding. For example, referring to FIG. 9A, one variable group has the variable group name "Beds" and a numerical encoding of "122".

Each schema (300) includes one or more tasks (302A, 302N). Each task corresponds to a specific goal to be accomplished. For example, the task may be to book a hotel room. A task (302) may be sub-divided into distinct sub-tasks (304A, 304N). Each sub-task corresponds to a sub-goal to be accomplished, where completion of the sub-goal is required to complete the goal of the related task. For example, two sub-tasks of the above task may be (i) find a hotel and (ii) select a room.

A task (302) may also be directly associated with one or more variable groups (306A, 306N). Each variable group corresponds to a group of related variables (308A, 308N). For example, assume that the task is "rent a car" then a variable group may be "extras" where the related variables include satellite radio and navigation system. In one embodiment of the invention, at least one variable value for one of the variables in the group of related variables may be required to complete the task. Further, a variable group (306) may be associated with one or more variable groups (306A, 306N). This flexibility permits the schema to nest variable groups.

A task (302) may also be directly associated with one or more variables (308A, 308N). Each variable specifies a variable value that may be required in order to complete the task. Said another way, if the task is directly (as opposed to indirectly related via sub-tasks or variable groups) to the task, then a variable value for each variable directly associated with the task may be required to complete the task.

A sub-task (304) may be directly associated with one or more variable groups (306A, 306N). In one embodiment of the invention, at least one variable value for one of the variables in the group of related variables may be required to complete the sub-task. A sub-task (304) may also be directly associated with one or more variables (308A, 308N). Each variable specifies a variable value that may be required in order to complete the sub-task. Said another way, if the sub-task is directly (as opposed to indirectly related via variable groups) to the sub-task, then a variable value for each variable directly associated with the sub-task may be required to complete the sub-task. Though not shown in FIGS. 3A and 3B, a sub-task (304) may be associated with one or more sub-tasks (304A, 304N).

Figure 9A:
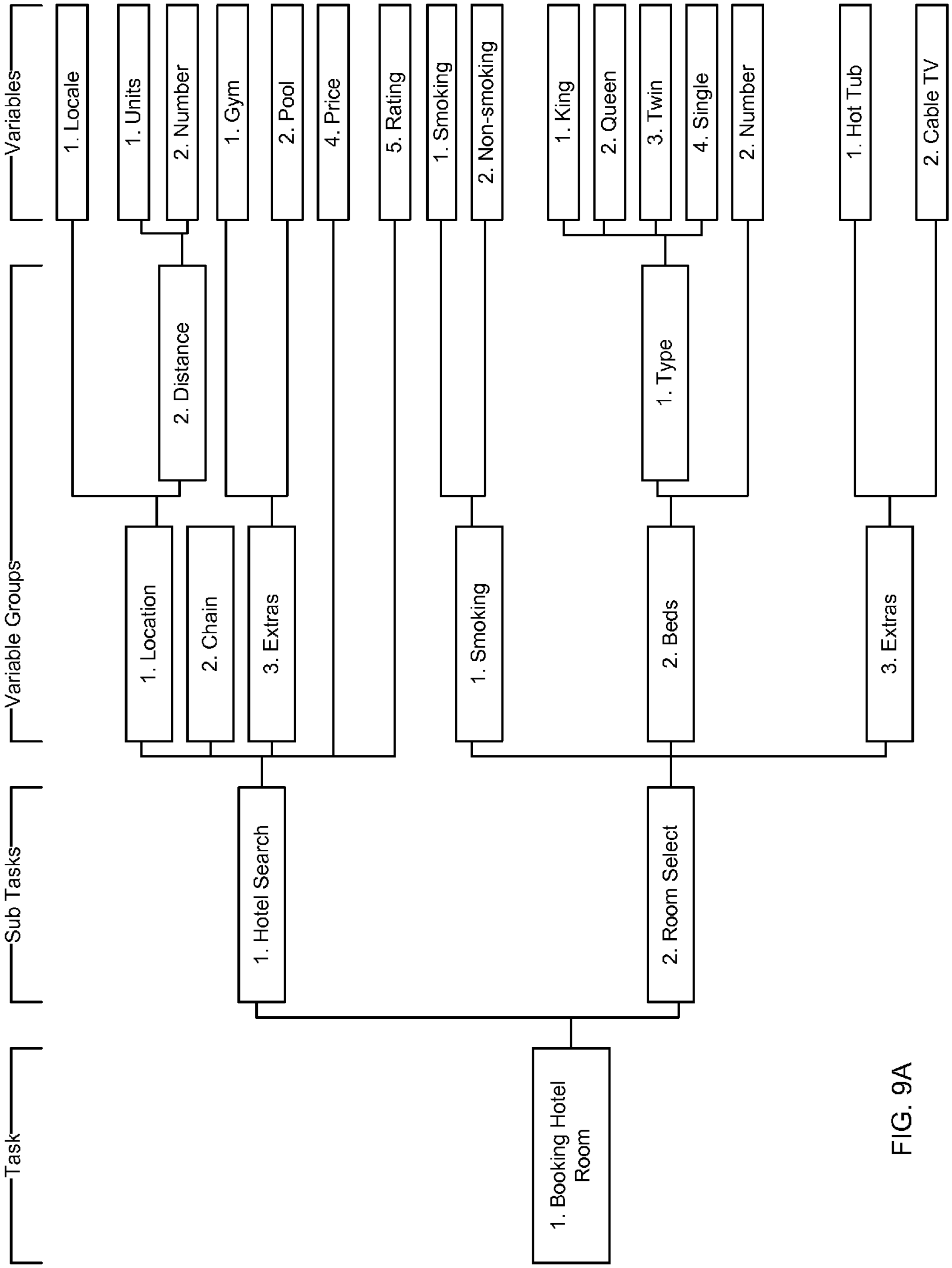

In one embodiment of the invention, the various elements in the schema are arranged in a tree data structure, for example, as shown in FIG. 9A. However, other data structures may be used to represent the schema provided that such data structures maintain the hierarchical relationships between the elements as described above in FIGS. 3A and 3B.

FIGS. 4-8 show flowcharts in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel. In one embodiment of the invention, the steps shown in any of the flowcharts may be performed in parallel with the steps shown in any of the other flowcharts.

Figure 4:
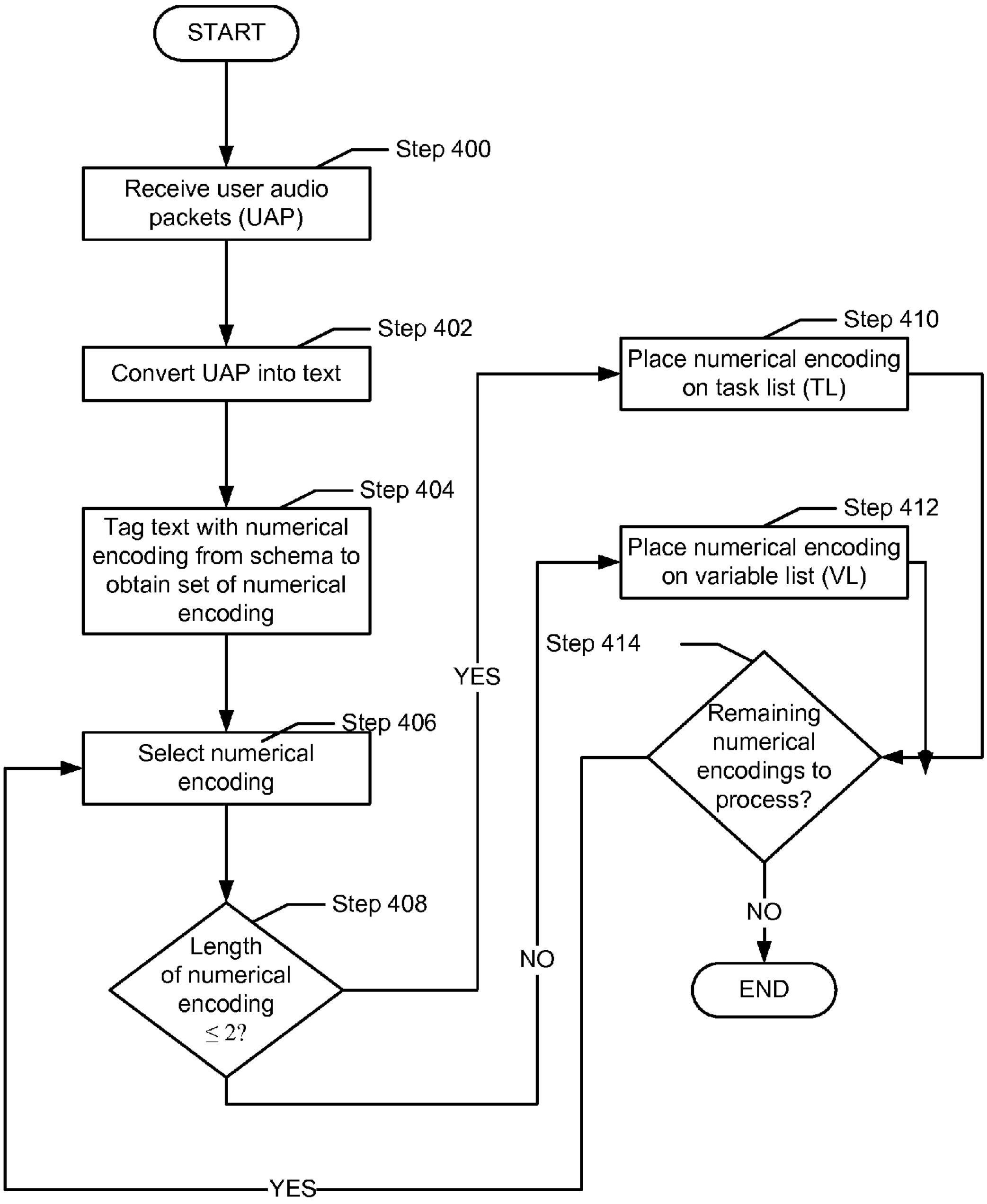
FIG. 4 shows a flowchart for populating a task list and a variable list in accordance with one or more embodiments of the invention.

FIG. 4 shows a flowchart for populating a task list and a variable list in accordance with one or more embodiments of the invention. In Step 400, user audio packets (UAP) are received from a user device. In Step 402, the UAPs (or more specifically, the digital audio data within the UAPs) are converted to text by the audio-text conversion engine (202).

In Step 404, each entity in the text is tagged as noise or with a numerical encoding to obtain a set of numerical encodings. Tagging the entity as noise or with a numerical encoding associates the entity with a value denoting noise or with a numerical encoding. In one embodiment of the invention, the tagging engine is trained using the schema and an appropriate training corpus (i.e., sentences that are used to train the tagging engine to correctly tag entities in the text using the numerical encodings in the schema).

In Step 406, a numerical encoding from the set of numerical encodings is selected. In one embodiment of the invention, if steps 404 and 406 are performed in parallel, then the numerical encoding selected in step 406 corresponds to a numerical encoding that has been used to tag at least one entity in the text.

In Step 408, a determination is made about whether the numerical encoding has a length less than or equal to two. For example, the following numerical encoding—"11" has a length of two. If the Gorn Address has a length less than or equal to two, the process proceeds to Step 410; otherwise, the process proceeds to Step 412.

In Step 410, the Gorn Address is classified as identifying a task or a sub-task and is placed on a task list (TL). The TL may be maintained by the task manager. A pre-determined length (or than length≦2) may be used to classify the Gorn Address as identifying a task or sub-task without departing from the invention. The entity from the text associated with the Gorn Address may also be placed in the TL with the Gorn Address. Alternatively, a separate data structure may be used to maintain the association between the entities and the numerical encodings.

In Step 412, the numerical encoding is classified as identifying a variable group or variable and is placed on a variable list (VL). The entity from the text associated with the numerical encoding may also be placed in the VL with the numerical encoding. Alternatively, a separate data structure may be used to maintain the association between the entities and the numerical encodings. One data structure may be used to maintain the association between all entities and the numerical encodings regardless of how each entity is classified.

In Step 414, a determination is made about whether there are additional numerical encodings to process. If there are additional numerical encodings to process, the process proceeds to Step 406; otherwise the process ends.

After FIG. 4, the task list and the variable list are populated with the numerical encodings and the task manager can now proceed to process the numerical encodings on the task list. At this stage, the NLP system can process the text (obtained in Step 402) using the numerical encodings.

Figure 5:
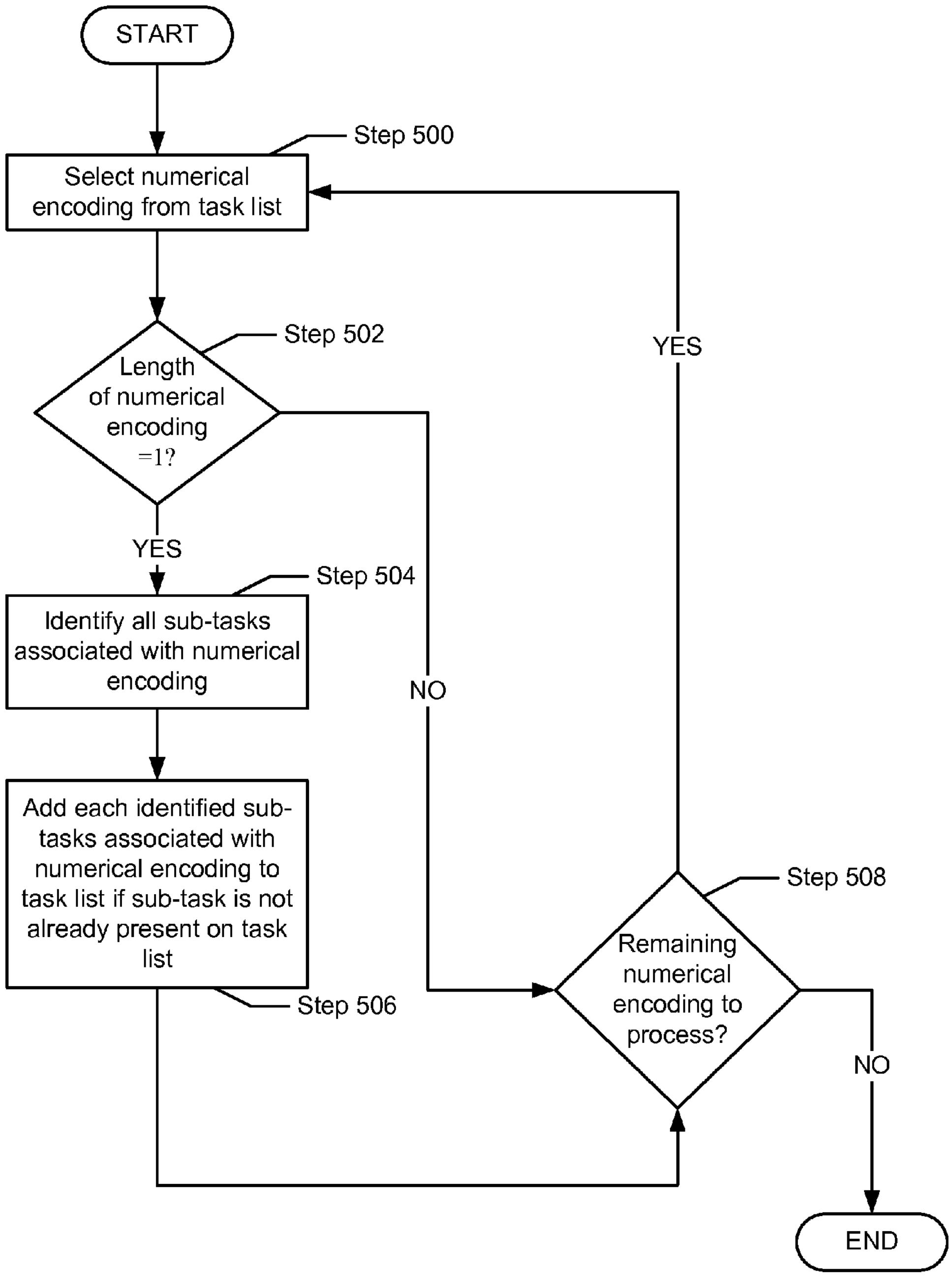
FIG. 5 shows a flowchart for processing numerical encodings on a task list in accordance with one or more embodiments of the invention.

FIG. 5 shows a flowchart for processing numerical encodings on a task list in accordance with one or more embodiments of the invention. In Step 500, a numerical encoding is selected from the TL. In Step 502, a determination is made about whether the length of the numerical encoding equals one. This determination enables the task manager to classify the numerical encoding as identifying a task (if length equals one) or a sub-task (if length is greater than one). If the length of the numerical encoding equals one, the process proceeds to Step 504; otherwise, the process proceeds to Step 508.

In Step 504, all sub-tasks associated with the numerical encoding (selected in Step 500) are obtained. In one embodiment of the invention, the sub-tasks associated with the numerical encoding are identified by locating all sub-tasks in the schema that include the numerical encoding. For example, if the numerical encoding is "1" and the sub-tasks in the schema have a length of less than or equal to two, then sub-tasks in the schema with the numerical encoding of length less than or equal to two that include the numerical encoding may be: (i) sub-task associated with numerical encoding "11" and (ii) sub-task associated with numerical encoding "12". However, a sub-task with the numerical encoding "21" would not be considered as associated with the numerical encoding of "1" as the sub-task with the numerical encoding "21" does not include the numerical encoding "1". More specifically, in order for one numerical encoding to "include" another numerical encoding, the "included" numerical encoding must be in the most significant position of the numerical encoding. For example, numerical encoding "21" includes numerical encoding "2" but not numerical encoding "1". In another example, numerical encoding "211" includes numerical encoding "21" but not numerical encoding "11".

Continuing with FIG. 5, in Step 506, the TL is updated to include any sub-tasks identified in Step 504 that are not already included on the TL. In Step 508, a determination is made about whether there are additional numerical encodings to process on the TL. If there are additional numerical encodings to process on the TL, the process proceeds to Step 500; otherwise the process ends.

Though not shown in FIG. 5, in one or more embodiments of the invention, the TL may only include numerical encodings corresponding to sub-tasks. In such a scenario, the task manager may process each of the sub-tasks to identify the corresponding task. The task with which the sub-task is associated may be identified by determining the numerical encoding that is included within the numerical encoding associated with the sub-task. For example, a sub-task associated with numerical encoding "21" includes numerical encoding "2", where numerical encoding "2" identifies a task within the schema. Once the task(s) is identified, the process in FIG. 5 may be used to identify all sub-tasks associated with the task(s).

At this stage, the task manager has identified the tasks and sub-tasks based on the utterance from the user (see FIG. 4, Step 400). The task manager than processes the tasks and sub-tasks in accordance with FIG. 6.

Figure 6:
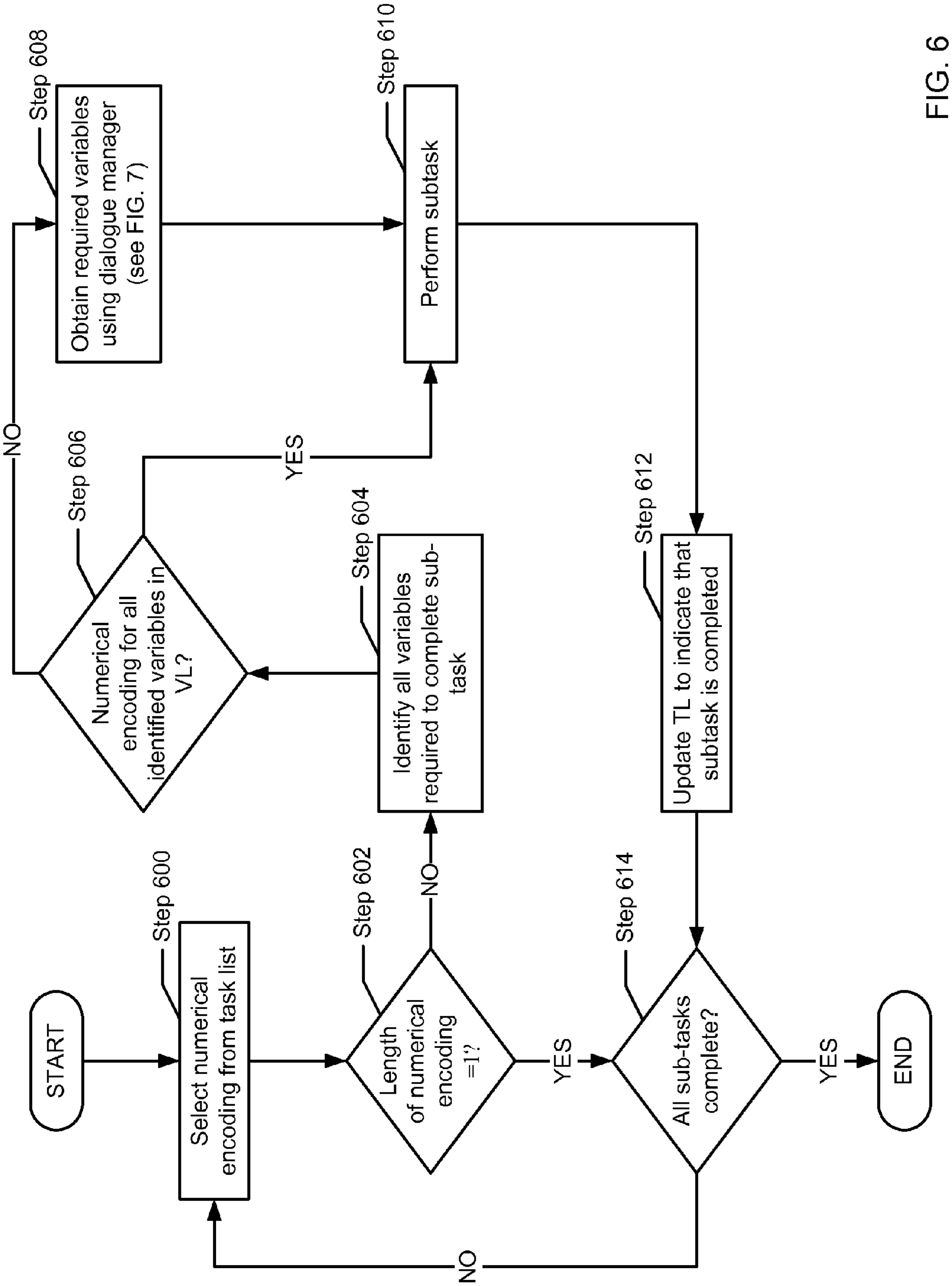
FIG. 6 shows a shows a flowchart for generating and processing tasks and sub-tasks using numerical encodings.

FIG. 6 shows a shows a flowchart for generating and processing a task and sub-tasks using numerical encodings. In Step 600, a numerical encoding is selected from the TL. In Step 602, a determination is made about whether the length of the numerical encoding equals one. This determination enables the task manager to classify the numerical encoding as identifying a task (if length equals one) or a sub-task (if length is greater than one). If the length of the numerical encoding equals one, the process proceeds to Step 614; otherwise, the process proceeds to Step 604.

In Step 604, all variables required to complete the sub-task are identified. In one embodiment of the invention, the schema may be analyzed to determine which variables may be required to complete the sub-task. The schema may specify which variable values are required and which variables are optional. Alternatively, a separate data structure may be used to track which variables are required and optional for a given sub-task or task. In one or more embodiments of the invention, a determination of which variables may be required to complete the sub-task includes (i) identifying all variable groups associated with the sub-task and (ii) determining which of the variable groups are required to complete the sub-task or/and (i) identifying all variables values associated with the sub-task and (ii) determining which of the variables are required to complete the sub-task. In one embodiment of the invention, the variables and/or variable groups required (or optionally required) to complete the sub-task correspond to variable groups and/or variables associated with numerical encodings that "include" the numerical encoding associated with the sub-task.

In Step 606, a determination is made about whether all the variables (which may be associated with a variable group) required to complete the sub-task are available in the variable list. In one embodiment of the invention, this determination is made by determining whether numerical encodings corresponding to the required variables are present in the VL. If all the required variables are present in the variable list the process proceeds to Step 610; otherwise the process proceeds to step 608. In some embodiments of the invention, even if all required variable values are present, the dialogue manager may still attempt to solicit variable values for optional variables. In such cases, the process proceeds to Step 608.

In Step 608, values for the required (and/or optional) variables are obtained using the dialogue manager. Additional detail about the operation of the dialogue manager is described in FIGS. 7 and 8.

In Step 610, once all the variable values are obtained, the sub-task is performed. In one embodiment of the invention, performing the sub-task may include generating a query using the query engine, issuing the query, and receiving information in response to the query, processing the information using the answer processing engine, and providing the results to the user (via SAPs). In some embodiments of the invention, information returned in response to the query may be stored in the results cache. The information in the results cache may then be further processed by another sub-task, which ultimately returns a result to the user (via the SAPs).

In Step 612, the task list is updated to indicate that the sub-task is completed. In Step 614, a determination is made about whether there are any remaining sub-tasks to complete on the task list. If there are remaining sub-tasks to complete on the task list, the process proceeds to Step 600; otherwise the process ends. In some embodiments once all the sub-tasks for a given task are complete, the task is deemed to be completed. In other embodiments of the invention, the results generated by each of the sub-tasks may be used as inputs to the task and, in such cases, the completion of the task requires additional processing of the results from the sub-tasks to ultimately achieve the goal of the task.

If the task does not include any sub-tasks, then Steps 604-614 may be performed for a task instead of a sub-task without departing from the invention. Further, the process shown in FIG. 6 may be performed in parallel for each task in the task and/or sub-task in the task list without departing from the invention.

Figure 7:
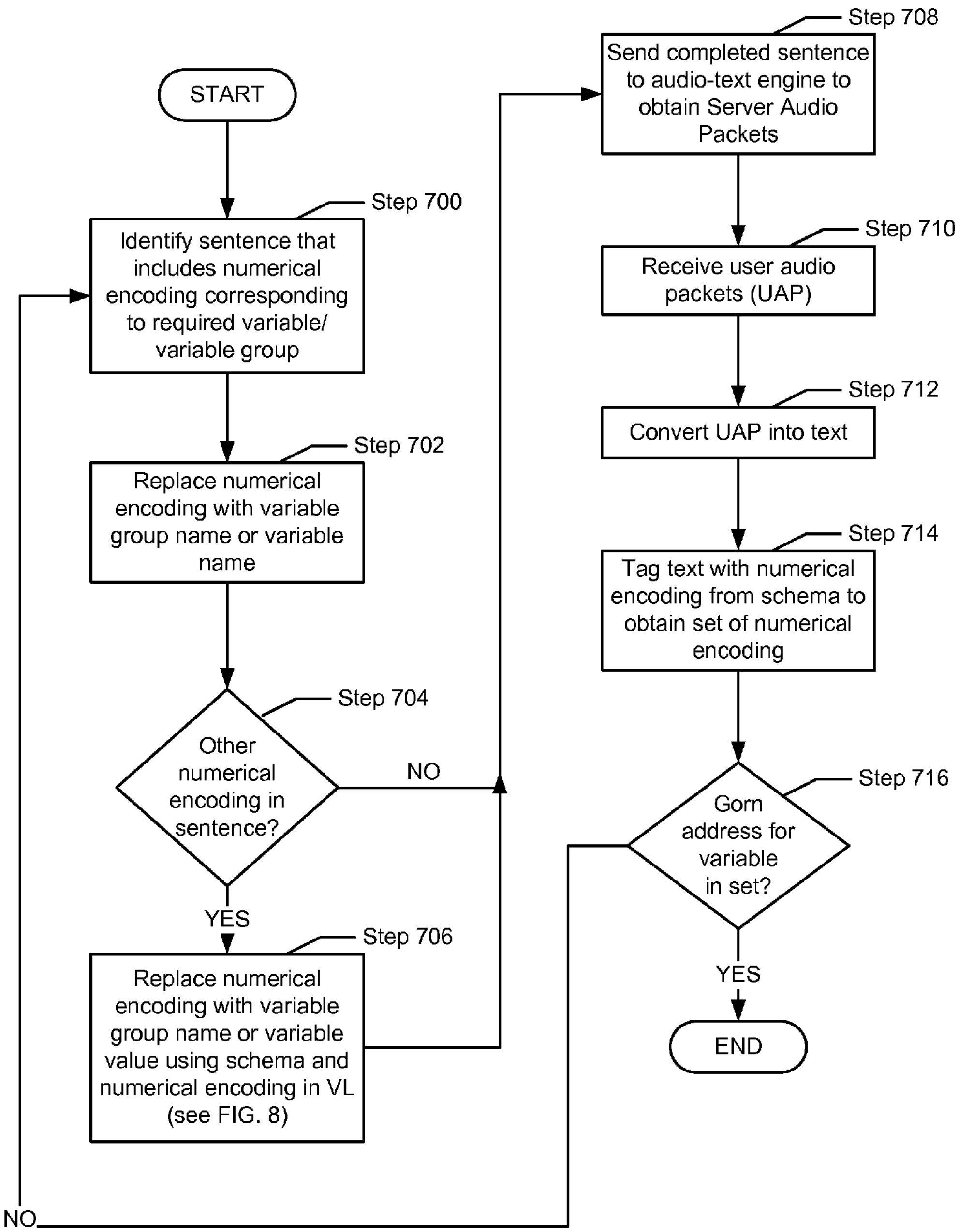
FIGS. 7 and 8 show flowcharts for generating dialogue using numerical encodings.
Figure 8:
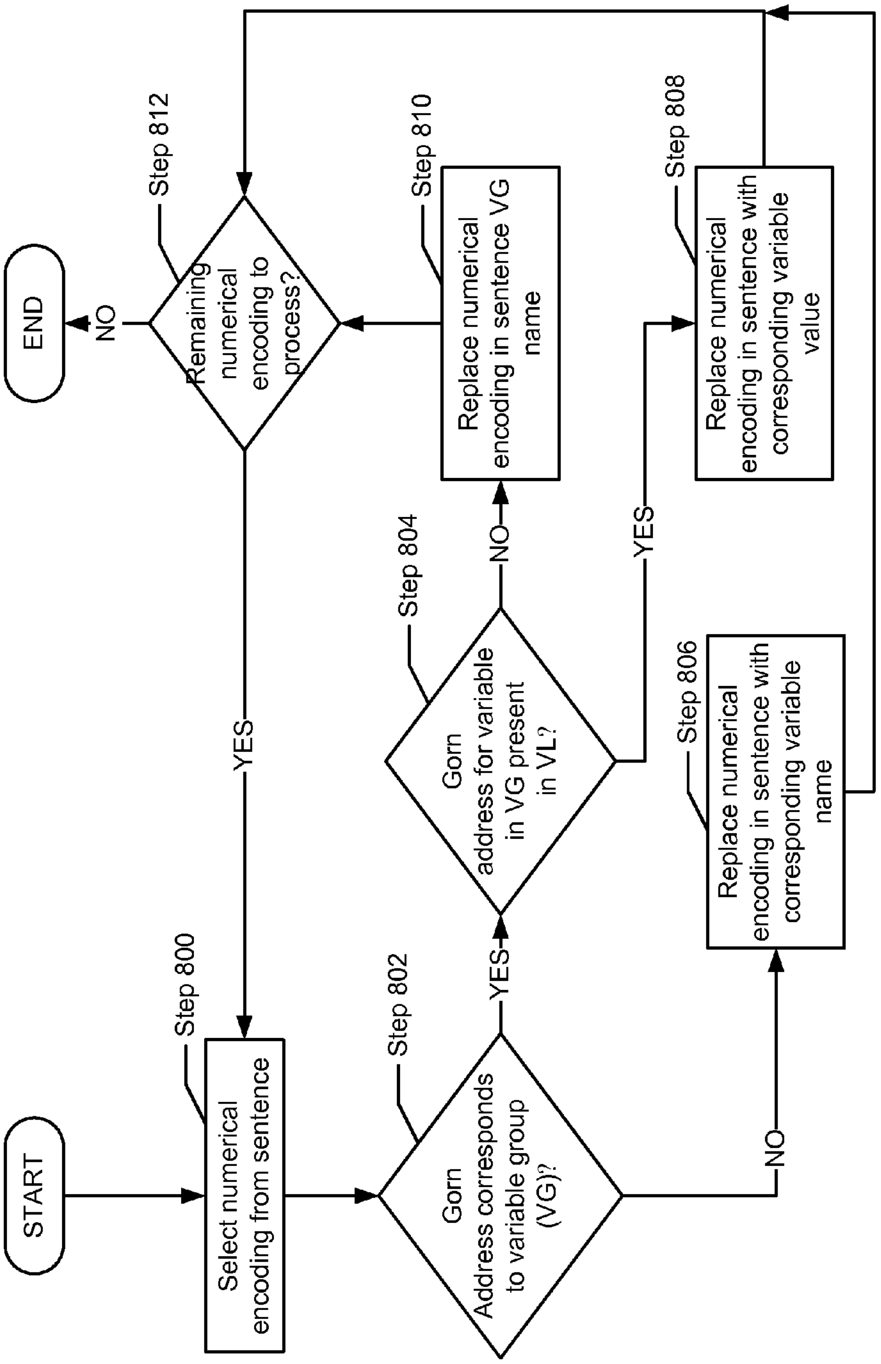

FIGS. 7 and 8 show flowcharts for generating dialogue using numerical encodings. In Step 700, one sentence is identified that includes the numerical encoding corresponding to the variable or variable group for which a variable value is required (or optionally required) in order to complete a task or sub-task. The sentence is typically in the form of a question that is designed to solicit a variable value from the user of the user device.

In Step 702, the numerical encoding in the sentence is replaced with the variable name or the variable group name. The variable name or variable group name may be obtained directly from the schema. In Step 704, a determination is made about whether there are additional numerical encodings in the sentence. If there are additional numerical encodings in the sentence, then the process proceeds to Step 706; otherwise the process proceeds to Step 708.

In Step 706, the additional numerical encodings in the sentence are replaced with the appropriate variable group name or variable name. One embodiment for replacing the numerical encodings in the sentence using variable group names or variable names is described in FIG. 8. In Step 708, the completed sentence is sent to the audio-text conversion engine to obtain Server Audio Packets (SAPs). The generated SAPs are subsequently sent to the user device. In Step 710, UAPs in response to the SAPs are received.

In Step 712, the UAPs are converted to text by the audio-text conversion engine. In Step 714, each entity in the text is tagged as noise or with a numerical encoding to obtain a set of numerical encodings. In Step 716, a determination is made about whether the numerical encoding (i.e., the numerical encoding used in Step 700 to identify the sentence) is present in the set of numerical encodings obtained in Step 714. Said another way, the step 716 determines whether the user provided an appropriate variable value—i.e., a variable value required to complete the task or sub-task. If the numerical encoding is not present in the set of numerical encodings, the process proceeds to Step 700; otherwise the process ends.

Referring to FIG. 8, FIG. 8 shows a method for replacing the numerical encodings in the sentence using variable group names or variable names in accordance with one or more embodiments of the invention.

In Step 800, a numerical encoding is selected from the sentence. In Step 802, a determination is made about whether the numerical encoding corresponds to a variable group (VG). If the numerical encoding corresponds to a variable group (VG), then the process proceeds to Step 804; otherwise the process proceeds to Step 806.

In Step 804, a determination is made about whether a numerical encoding for a variable in the variable group is present in the variable list. In one embodiment of the invention, a variable is associated with the variable group if the numerical encoding associated with the variable "includes" the numerical encoding associated with the variable group. For example, referring to FIG. 9A, the variable with variable name "pool" and a numerical encoding of "1132" is associated with the variable group with the label "extras" and a numerical encoding of "113". Accordingly, if numerical encoding "1132" is present in the variable list, then the determination is step 804 would indicate that a variable in the variable group associated with numerical encoding "113" is present in the variable list.

Returning to Step 804, if the numerical encoding for a variable in the variable group is present in the variable list, the process proceeds to Step 808; otherwise the process proceeds to Step 810.

In Step 806, the numerical encoding in the sentence corresponding to the variable is replaced with the variable name. In Step 808, the numerical encoding in the sentence corresponding to the variable group is replaced with the entity (i.e., the portion of text tagged with the numerical encoding associated with the variable). In Step 810, the numerical encoding in the sentence corresponding to the variable group is replaced with the variable group name.

In Step 812, a determination is made about whether there are any remaining numerical encodings in the sentence to process. If there are remaining numerical encodings in the sentence to process, the process proceeds to Step 800; otherwise the process ends.

While FIGS. 4-8 describe embodiments in which UAPs are received from a user device and SAPs are generated and sent to the user device, the invention is not limited to such embodiments. Specifically, embodiments of the invention may be implemented such that the user device provides text that includes an utterance(s) and the text is processed in accordance with the above description. Further, the results of such processing may be transmitted to the user device as text or as SAPs or some combination thereof. In addition, while the FIGS. 4-8 describe embodiments in which the NLP system communicates with a user device being operated by a user, the embodiments of the invention may be implemented where the user device is operated by a process—e.g., a chatbot or another process(es) that can generate text that includes utterances.

FIGS. 9A-9K show an example in accordance with one or more embodiments of the invention. This example is not intended to limit the scope of the invention or the claims.

FIG. 9A shows a domain specific schema ("schema") for booking a hotel room. The schema includes a task ("booking a hotel room"), two sub-tasks ("hotel search" and "room select"), eight variable groups ("location", "chain", "extras", "smoking", "beds", "extras", "distance", and "type"), and 16 variables "(locale", "units", "number", "gym", "pool", "price", "rating", "smoking", "non-smoking", "king", "queen", "twin", "single", "number", "hot tub", and "cable TV"). Each of the aforementioned elements is associated with a numerical encoding. Table 1 shows the Gorn Address associated with each of those elements.

TABLE 1

Schema Elements - Numerical Encoding Mapping

| Element (identified by the element name) | Numerical Encoding |
|---|---|
| Booking Hotel Room | 1 |
| Hotel Search | 11 |
| Room Select | 12 |
| Location | 111 |
| Chain | 112 |
| Extras | 113 |
| Smoking | 121 |
| Beds | 122 |
| Extras | 123 |
| Distance | 1112 |
| Type | 1221 |
| Locale | 1111 |
| Units | 11121 |
| Number | 11122 |
| Gym | 1131 |
| Pool | 1132 |
| Price | 114 |
| Rating | 115 |
| Smoking | 1211 |
| Non-smoking | 1212 |
| King | 12211 |
| Queen | 12212 |
| Twin | 12213 |
| Single | 12214 |
| Number | 1222 |
| Hot tub | 1231 |
| Cable TV | 1232 |

Figure 9B:
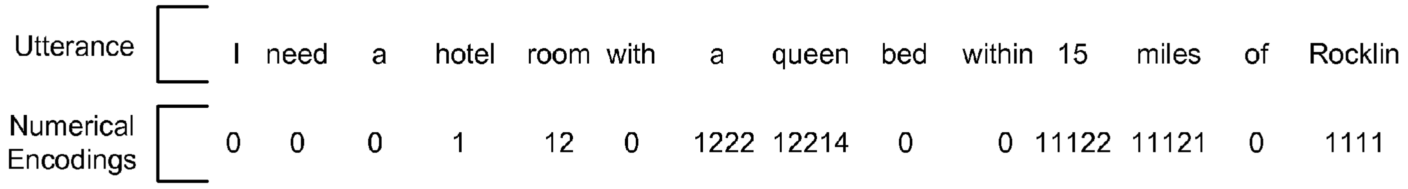

Referring to FIG. 9B, assume that the user device obtains the following utterance from the user and sends the utterance to the NLP system via one or more user audio packets. The utterance is "I need a hotel room with a queen bed within 15 miles of Rocklin." The NLP system subsequently extracts the digital audio data from the UAPs and converts the digital audio data into text. The tagging engine, which was previously trained using the schema shown in FIG. 9A, tags each entity in the text as noise (denoted by "0" in FIG. 9A) or with a numerical encoding.

As shown in FIG. 9B, the tagging engine identifies the following entities as noise: I, need, a (the first instance in the text), with, bed, within, of. The remaining entities are tagged with numerical encodings (see Table 2).

TABLE 2

Entities - Numerical Encoding

| Entity | Numerical Encoding (with which entity is tagged) |
|---|---|
| hotel | 1 |
| MOM | 12 |
| a (second instance) | 1222 |
| queen | 12214 |
| 15 | 11122 |
| miles | 11121 |
| Rocklin | 1111 |

At this stage, the tagging engine has associated each of the entities in the utterance with a numerical encoding—thereby providing context for the tagged entities. Said another way, by tagging the various entities with numerical encodings, the NLP system is able to efficiently determine the meaning of the utterance in view of the schema. As a result, the NLP system may directly proceed to processing the numerical encoding to provide an answer to the user.

Figure 9C:

Referring to FIG. 9C, the numerical encodings listed in Table 2 are analyzed in accordance with the method shown in FIG. 4 to identify which numerical encodings correspond to tasks or sub-tasks and which correspond to variable groups or variables. In this example, the pre-determined length threshold is two. Accordingly, all numerical encodings that have a length of less or equal to two are classified as tasks or sub-tasks and, resultantly, placed in the task list. The remaining numerical encodings are placed in the variable list. In this example, numerical encoding "1" and "12" are classified as identifying tasks or sub-tasks and, accordingly, placed in the task list.

Figures 9D, 9E:

Referring to FIG. 9D, the numerical encodings in the task list (see FIG. 9C) are processed in accordance with the method shown in FIG. 5 to identify any other sub-tasks related to any task identified in the task list. In this example, the task list (see FIG. 9C) includes a task (denoted by the presence of numerical encoding "1" in the task list). Based on the schema in FIG. 9A, the sub-tasks associated with numerical encoding "1" are sub-tasks associated with numerical encodings "11" and "12". Because numerical encoding "12" is already in the task list, only numerical encoding "11" is added to the task list. At this stage, all sub-tasks for the task (identified by numerical encoding "1") are present on the task list and the tasks and sub-tasks may be processed by the task manager.

Referring to FIG. 9E, assuming that the dialogue manager includes (or has access to) the sentences shown in FIG. 9E. As shown in FIG. 9E, the sentences are in the form of questions and include one or more numerical encodings—where the numerical encodings correspond to numerical encodings in the schema. In one embodiment of the invention, the numerical encodings correspond to variable group names or variable groups.

The following discussion details how the task manager, in conjunction with other components in the NLP system, process the tasks and sub-tasks in the task list.

Figure 9F:

Referring to FIG. 9F, the task manager selects numerical encoding "12" to process. Once selected, the task manager determines what variables are required to complete the sub-task associated with numerical encoding "12". In this example, in order to complete the aforementioned sub-task the NLP system requires a variable value for the variable identified with numerical encoding "121". The task manager searches the variable list for numerical encodings that match "121" or "121*", where * is a wildcard search operator. In this example, there is not a numerical encoding that matches the above search criteria in the variable list, the task manager requests that the dialogue manager generate a dialogue to solicit a variable value from the user. The dialog manager subsequently selects a sentence (see FIG. 9E) that includes the numerical encoding "121". In this example, the dialogue manager selects "Do you want a [121] room?" The dialogue manager subsequently replaces [121] with the variable group name—"smoking". The completed sentence is then sent to the user via one or more SAPs. In one embodiment of the invention, if multiple sentences include the target numerical encoding (e.g., "121" in the example above), the dialogue manager may select the sentence that includes the least number of numerical encodings. Other heuristics may be used to selecting a sentence without departing from the invention.

Figure 9G:
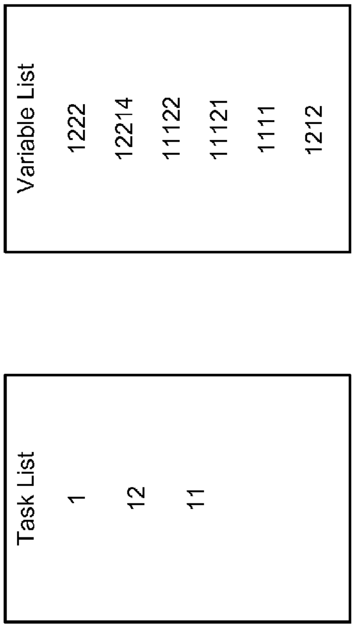

Referring to FIG. 9G, in response to the SAPs the user device returns one or more UAPs. In this example, the UAPs include text which includes the utterance "I want a non-smoking room." The entity "non-smoking" is subsequently tagged with a numerical encoding of "1212". This numerical encoding is subsequently added to the variable list.

Referring to FIG. 9H, in this example, in order to complete the aforementioned sub-task the NLP system requires a variable value for the variable identified with numerical encoding "123". The task manager searches the variable list for numerical encodings that match "123" or "123*", where * is a wildcard search operator. In this example, there is not a numerical encoding that matches the above search criteria in the variable list. Accordingly, the task manager requests that the dialogue manager generate a dialogue to solicit a variable value from the user. The dialog manager subsequently selects a sentence (see FIG. 9E) that includes the numerical encoding "123". In this example, the dialogue manager selects "What type of [123] do you want in your [121] room with the [1221] bed?" The dialogue manager subsequently replaces [123] with the variable group name—"extras". In accordance with FIG. 8, the dialogue manager replaces [121] with "non-smoking" and [1212] with "queen". The completed sentence is then sent to the user via one or more SAPs.

Referring to FIG. 9I, in response to the SAPs the user device returns one or more UAPs. In this example, the UAPs include text which includes the utterance "cable TV." The entity "cable TV" is subsequently tagged with a numerical encoding of "1232". This numerical encoding is subsequently added to the variable list. At this stage, the sub-task associated with the numerical encoding "12" is completed.

Referring to FIG. 9J, the task manager selects numerical encoding "11" to process. Once selected, the task manager determine what variables are required (or optionally required) to complete the sub-task associated with numerical encoding "11". In this example, in order to complete the aforementioned sub-task the NLP system optionally requires a variable value for the variable identified with numerical encoding "113". The task manager searches the variable list for numerical encodings that match "113" or "113*", where * is a wildcard search operator. In this example, there is not a numerical encoding that matches the above search criteria in the variable list. Accordingly, the task manager requests that the dialogue manager generate a dialogue to solicit a variable value from the user. The dialog manager subsequently selects a sentence (see FIG. 9E) that includes the numerical encoding "113". In this example, the dialogue manager selects "What type of [113] do you want in your hotel room?" The dialogue manager subsequently replaces [113] with the variable group name—"extras". The completed sentence is then sent to the user via one or more SAPs.

Referring to FIG. 9K, in response to the SAPs the user device returns one or more UAPs. In this example, the UAPs include text which includes the utterance "none." At this stage, the sub-task associated with the numerical encoding "11" is completed.

The task manager may then use the input received from both of the sub-tasks to generate a single query to locate hotel rooms that satisfy the user criteria received from the sub-tasks. The query may be submitted to the information source (s) in order to obtain the relevant information. The resulting information may then be processed by the answer processing engine and provided to the user device via SAPs.

In one embodiment of the invention, when all the variables required for the sub-task associated with numerical encoding "12" are obtained, the task manager may instruct the query engine to generate a query to obtain information from one or more information sources and to store the information in the results cache. Once all variables required for the sub-task associated with numerical encoding "11" are obtained, the task manager may instruct the query engine to either perform an additional query using the variable values for the sub-task associated with numerical encoding "11" and to store the resulting information in the results cache. Once information for both sub-tasks is in the results cache, in order to complete the task (with which the sub-tasks as associated) the task manager may instruct the query engine to query the information in the results cache to obtain an answer(s) for the user. Other methods of performing the sub-tasks in parallel may be used without departing from the invention.

While the above example showed the use of the dialogue manager to solicit variable values from the user, the dialogue manager may also use the user profile associated with the user to obtain variable values without departing from the invention. In such cases, the dialogue manager (or another component in the NLP system) may query the user profiles to obtain variable values corresponding to the numerical encodings that are required or optionally required to perform the task or sub-task.

In one or more embodiments of the invention, the tagging engine leverages domain knowledge to perform noise filtering thereby enabling the tagging engine to filter out irrelevant words immediately during the tagging process.

Further, in one or more embodiments of the invention, because tasks are word-sense sensitive and the tagging engine can be trained from context with values tightly coupled to the task(s), the tagging engine is able to automatically distinguish senses of words and tags accordingly (using the appropriate numerical encodings) on whether the word is task-relevant. For example, referring to the example described in FIGS. 9A-9K, "queen" is retained because the sense of 'bed size' is relevant to the context, while in another sentence context it could be construed differently.

In one or more embodiments of the invention, the tagging engine allows the dialogue manager to efficiently customize responses directly pursuing dialogue goals. Further, while standard dialogue systems often have simple natural language generation where a single string constitutes an immutable reply in a particular dialogue state, embodiments of the invention implement a dialogue manager that is able to directly pursue some dialogue goal by triggering a template containing the tag (e.g., numerical encoding) as a variable. See e.g., FIGS. 9E and 9F.

In one embodiment of the invention, because the schema unifies task identification and task execution in a single framework (e.g., multiple sub-tasks parameterize a parent task (e.g., booking hotel room hotel search, room selection) and multiple task parameters parameterize a simple task (e.g., bed selection F type and number)), the tags associated with a word by the tagging engine indicates how the word can contribute to both task selection (see e.g., FIG. 6) and task execution (see e.g., FIGS. 7 and 8).

Further, in one embodiment of the invention, the tags (e.g., numerical encodings) used by the tagging engine possess a rich tag syntax that allows them to be immediately utilized with minimal extra processing. For example, the NLP, in one or more embodiments of the invention, may filter and classify words in an utterance from the user into tasks, sub-tasks, variable groups, and variables in one pass.

In one or more embodiments of the invention, the numerical encoding of hierarchical task trees provides an index of similarity (i.e., that two entities may both be associated with the same element(s) in the schema). For example, two entities may be similar (or have a high index of similarity) if they are tagged with numerical encodings for different variables that belong to the same variable group. Because the numeric encoding scheme enables one to nest element-types inside other element-types, an index of similarity may be obtained from the set of elements the entities have in common. When this taxonomy is numerically encoded, this index of similarity is simply the prefix common to the numerical encoding for both entities. For example, referring to FIG. 9A, the numerical encoding for "queen" is 12212 and the numerical encoding for "king" is 12211. In this example, the index of similarity may be 122—which indicates at what level of granularity the entities are similar—namely, the entities are similar at three levels of granularity. By contrast, the numerical encoding for "non-smoking" is 1212. In this case, the index of similarity between queen and non-smoking may be 12—which indicates at what level of granularity the entities are similar—namely, the entities are similar at two levels of granularity. Accordingly, based on the aforementioned numerical encodings queen and king are more similar than queen and non-smoking.

In contrast to the invention, traditional tagging systems perform a hard classification on each entity. The set of categories in such systems can only denote whether two entities are in an identical class (e.g., "noun") or in distinct classes. The traditional tagging systems cannot convey that two words can be classified as being in similar while not identical.

Software instructions to perform embodiments of the invention may be stored on a nono-transitory computer readable medium such as a magnetic storage, optical storage, solid state storage, or any other computer readable storage device. Further, such instructions may be executed by processor(s) as described above.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a task in a natural language processing (NLP) system, comprising:
- processing text to obtain a plurality of numerical encodings, wherein the text comprises a plurality of entities, wherein each of the plurality of numerical encodings is associated with one of the plurality of entities, and wherein the text is derived from an utterance;
- populating a task list with each of the plurality of numerical encodings that have a length less than a pre-determined length;
- populating a variable list with each of the plurality of numerical encodings that have a length greater than a pre-determined length;
- selecting a numerical encoding from the task list, wherein the numerical encoding identifies a task in a domain-specific schema;
- determining that the variable list does not include a variable value required to perform the task;
- generating a sentence to obtain the variable value associated with a variable, wherein the variable is associated with a second numerical encoding, and wherein the second numerical encoding includes the numerical encoding;
- transmitting the sentence to a user device;
- in response to the transmitting, receiving the variable value for the variable in response to the dialogue sentence; and
- performing the task using the variable value.

2. The method of claim 1, further comprising:
- receiving user audio packets comprising the utterance from the user device; and
- converting the user audio packets to text.

3. The method of claim 1, wherein each of the numerical encodings in the task list identifies one selected from a group consisting of a task element in the domain-specific schema and a sub-task element in the domain-specific schema.

4. The method of claim 1, wherein each of the numerical encodings in the variable list identifies one selected from a group consisting of one of a plurality of variable groups in the domain-specific schema and one of plurality of variables in the domain-specific schema, wherein the variable is one of the plurality of variables.

5. A method for performing tasks in a natural language processing (NLP) system, comprising:
- processing text to obtain a plurality of numerical encodings, wherein the text comprises a plurality of entities, wherein each of the plurality of numerical encodings is associated with one of the plurality of entities, and wherein the text is derived from an utterance;
- populating a task list with each of the plurality of numerical encodings that have a length less than a pre-determined length;
- populating a variable list with each of the plurality of numerical encodings that have a length greater than a pre-determined length;
- selecting a numerical encoding from the task list, wherein the numerical encoding identifies a sub-task in a domain-specific schema;
- determining a task associated with the sub-task using the numerical encoding, wherein the task is associated with a second numerical encoding and wherein the numerical encoding includes the second numerical encoding;
- determining a second sub-task associated with the task, wherein the second sub-task is associated with a third numerical encoding and wherein the third numerical encoding includes the second numerical encoding; and
- performing the sub-task and the second sub-task.

6. The method of claim 5, wherein the sub-task and the second sub-task are performed in parallel.

7. The method of claim 5, wherein performing the sub-task comprises:
- identifying a variable required to perform the sub-task;
- identifying a numerical encoding associated with the variable; and
- making a determination that the numerical encoding associated with the variable is in the variable list,
- wherein performing the sub-task comprises using an entity of the plurality of entities, wherein the entity is associated with the numerical encoding associated with the variable.

8. The method of claim 5, wherein performing the sub-task comprises:
- identifying a variable group required to perform the sub-task, wherein the variable group is associated with a plurality of variables;
- making a determination that the variable list does not include any numerical encoding associated with any of the plurality of variables;
- selecting a sentence that includes a second numerical encoding, wherein the second numerical encoding is associated with a variable group;

generating complete sentence using the sentence and a variable group name associated with the variable group;

transmitting the complete sentence to a user device; and in response to the transmitting, receiving a variable value, wherein the variable value is associated with one of the plurality of variables, wherein performing the sub-task comprises using the variable value.

9. The method of claim 8, wherein each of the plurality of variables is associated with a distinct numerical encoding, wherein each of the distinct numerical encodings includes the second numerical encoding.

* * * * *